United States Patent [19]

Heffernan

[11] 4,210,113
[45] Jul. 1, 1980

[54] VACUUM VALVE FOR INTRODUCTION OF CONTROLLED AMOUNTS OF AIR INTO ENGINE SYSTEMS

[75] Inventor: Patrick M. Heffernan, Scottsdale, Ariz.

[73] Assignee: Sumari Engineering, Inc., Phoenix, Ariz.

[21] Appl. No.: 14,624

[22] Filed: Feb. 23, 1979

[51] Int. Cl.² .......................................... F02M 25/00
[52] U.S. Cl. ................................. 123/574; 123/41.86; 123/587
[58] Field of Search ............ 123/119 B, 41.86, 119 D, 123/124 R; 137/DIG. 8; 261/63 A

[56] References Cited

U.S. PATENT DOCUMENTS

| | | | |
|---|---|---|---|
| 1,286,930 | 12/1918 | Buckner | 123/119 B |
| 1,483,186 | 2/1924 | Minge | 123/119 B |
| 1,777,656 | 10/1930 | Silva | 123/119 B |
| 3,176,670 | 4/1965 | Sinbaldi | 123/119 B |
| 3,359,961 | 12/1967 | De Paolo | 123/119 B |
| 3,923,024 | 12/1975 | Dabrio | 123/119 B |
| 4,100,898 | 7/1978 | Mineck | 123/119 B |

*Primary Examiner*—Ronald H. Lazarus
*Attorney, Agent, or Firm*—Harry M. Weiss

[57] ABSTRACT

A valve is disclosed which is designed for injecting air into an internal combustion engine fuel/air inlet system under controlled conditions, i.e., no air is injected in the engine idle phase (typically under high manifold vacuum from 17 to 20 inches of mercury (in. Hg)). Air injection takes place by means of this valve as a differential function of manifold pressure which is related to throttle opening, (typically starting at about 16 in. of Hg and fully open to atmospheric air at about 8 to 10 inches of Hg, corresponding to open throttle conditions at normal vehicle cruise. The injection valve disclosed herein is designed for installation in series with the engine crankcase scavenging hose on the manifold side of the pollution control valve (PCV). Air flow through the manifold injection valve is controlled by a spring loaded piston and cylinder assembly which is actuated by a vacuum control hose connected to a take off point on the engine inlet manifold.

26 Claims, 3 Drawing Figures

VACUUM VALVE FOR INTRODUCTION OF CONTROLLED AMOUNTS OF AIR INTO ENGINE SYSTEMS

BACKGROUND OF THE INVENTION

1. Field of the Invention

This invention relates generally to devices for improving the performance of internal combustion engines and more particularly to devices for increasing the ratio of air to fuel vapor in the intake manifold of an internal combustion engine at all power settings and engine RPM's above idle.

2. Description of the Prior Art

Various devices have been developed in the past for combusting engine cylinder blow-by, which contains burnt and un-burnt hydrocarbon vapor in order to make a significant reduction in pollutants generated by cars.

Some recent production engines also include an arrangement for recirculating spent exhaust gases (EGR, or Exhaust Gas Recirculation) under controlled conditions. The purpose of EGR is to reduce peak combustion temperatures when each cylinder fires, thus reducing oxygen-nitrogen combinations (NOx) created by engine operation. Introduction of blow-by and exhaust gases in an engine intake system reduces the volume of oxygen available for combustion which in turn increases the percentage of unburnt hydrocarbons and carbon monoxide in the engine exhaust effluent. This places an additional burden on exhaust manifold air injection reactors and exhaust stream catalytic converters, when so used.

All engines will generally exhibit a large or small positive pressure resulting from piston ring blow-by which will increase as the engine shows wear and also as the mean effective compression pressure increases under high power loading. Blow-by gases are composed of unburnt fuel/air mixtures which pass the piston rings during the compression stroke and a mixture of condensed hydrocarbons, CO, $CO_2$ and water vapor which passes the piston rings during the power stroke. Also included are small quantities of oil residues and particulate matter.

Modern engine designs use so called positive crankcase ventilation (PCV) systems which keep the crankcase under slight negative pressure by drawing filtered external air, usually from the oil filler cap, through the engine crankcase to the pollution control valve on one of the engine valve covers. While recovered blow-by gases are usually too barren to burn alone, injection of blow-by gases into the fuel air mixture will improve gas mileage 3% or more.

Design experience over the past 75 years has demonstrated that it is practically impossible to produce commercial carburation systems which will give a uniform fuel air ratio at all speeds, power settings, temperatures and altitudes, especially during engine throttling. In the interest of ease of starting and smooth operation, the engine designer usually favors a fuel/air mixture which will average out on the rich side (more fuel than actually needed) under all modes of operation.

Thus, a need existed for the development of a reliable air injection system or device operating under control of manifold vacuum to improve overall performance and gas mileage of most cars. This need has long been recognized but never actually satisfied by the development of a relatively simple device to accomplish this goal.

Auxiliary manifold air supply valves for overcoming the shortcomings of the carburetor have been used ever since carburetors first appeared on engines. Manifold air valves have been controlled in a variety of ways, for example: by the throttle linkage; by a Bowden cable linkage adjusted by the driver; by a bi-metallic strip linked to a flapper valve (temperature compensation); by an aneroid capsule linked to an orifice valve (altitude compensation); by a fixed port connected to a partitioned part of the intake manifold (for re-vaporizing condensed fuel when operating temperature is below normal); or as an inverse function of the depression in manifold pressure below atmospheric when the engine is running.

Many current manifold air (MANAIR) systems are controlled by intake manifold vacuum (see, for example U.S. Pat. 3,923,024). Most U.S. type pollution control valves (PCVs) are also actuated by manifold vacuum. A common design consists of a ball check valve spring loaded in the open position. When manifold vacuum drops to the idle or closed throttle valve, the spring resistance is overcome and the ball valve is closed by atmospheric pressure, thus avoiding upset of the engine idle fuel/air ratio. One of the problems of the spring loaded manifold vacuum air admission valve is the wide variation in spring tension requirements for different engine sizes and carburetor configurations. The spring tension can not be easily made adjustable and the ball or modified ball valve is position and shock sensitive. A bad feature of this prior art type ball valve design is that the valve opens and closes within a narrow range of manifold pressures, which leads to mixture problems if the ball check design is used as an air admission valve.

A major objective of this invention is to overcome the above mentioned problems and to provide a simple, reliable, low cost and highly efficient valve device for administering air into internal combustion engines.

SUMMARY OF THE INVENTION

Accordingly, it is an object of this invention to provide an improved MANAIR valve which will permit installation on a wide variety of internal combustion engines.

It is also an object of this invention to provide an improved MANAIR valve which can be adjusted with an easily accessable screw to cut off air injection (idle cutoff) during both hot and cold engine operation at curb idle.

It is a further object of this invention to provide an improved MANAIR valve which will open gradually as the manifold vacuum decreases from idle and reaching maximum air injection at ½ to ¾ throttle opening.

It is still another object of this invention to provide an improved MANAIR valve having a separate vacuum control which is separate from the operation (or non-operation) of the PC valve.

It is still a further object of this invention to provide a slip-on air cleaner/silencer accessary in combination with the improved MANAIR valve.

The foregoing and other objects, features and advantages of this invention will be apparent from the following, more particular description of the preferred embodiments of the invention as illustrated in the accompanying drawings.

BRIEF DESCRIPTION OF THE FIGURES

FIG. 1 shows how the MANAIR air valve of this invention is installed in a typical internal combustion engine system or configuration. The MANAIR air valve of FIG. 1 comprises a valve body 12A which is preferably installed within a conveniently situated cut in a crankcase ventilation hose 12. The MANAIR air valve is located between the polution control valve (PCV) and a regular manifold (shown by the box identified as MANIFOLD) input fitting. The cut hose portion 12 coming from the PCV is forced over a serrated tapered fitting 14 located on the bottom right side portion of the valve body 12A (see FIGS. 1 and 2). Fitting 14A of the valve body 12A is forced in the hose 12 connected to the MANIFOLD input. The MANAIR valve is not sensitive to position, shock or reasonable vibration levels. Preferably, the valve body 12A should be installed in a vertical position. The line from the fitting 14A to the MANIFOLD should preferably be as short as possible and with adjustment screw 22 located on top of the valve body 12A accessable. Most PCV devices are coupled to a grommetted hole at the highest point of one of the engine valve actuator covers shown by reference numeral 10 in FIG. 1. A baffle 10A located within the valve actuator cover 10 is usually fitted in front of the PCV inlet to screen out oil splash and larger oil droplets. Thus, only the blow-by gases will pass into the PCV device coming around the baffle 10A of the valve actuator cover 10 into the ventilation line 12. It is also observed that the addition of air via the three air vents 20 (only one of which is shown in FIGS. 1 and 2) in the MANAIR valve body 12A to the blow-by mixture in the hose 12 will improve their assimilation in the intake MANIFOLD. Insertion of the MANAIR valve body 12A in the crankcase ventilation hose 12 does not interfere with free passage of crankcase or blow-by gases through the fittings 14 and 14A of the valve body 12A which cannot be closed by even maladjustment of the plunger portion of the adjustable screw 22. The piston 24 (FIG. 2) plunger portion 22 (FIGS. 1 and 2) and spring 22A (FIG. 2) only control entry of external air to the intake MANIFOLD. The piston 24 (FIG. 2) is actuated by a capillary hose 16 (FIG. 1) which on most cars can be connected to a "T" fitting 16A (FIG. 1). The "T" fitting 16A is installed in series with the vacuum hose connected to the vacuum spark or ignition distributor advance/retard mechanism. The center fitting of the "T" fitting 16A is connected to fitting 18 (FIG. 1) on the MANAIR valve body 12A.

FIG. 2 shows the internal construction of the MANAIR valve with the valve plunger 22 in the fully open position (low vacuum, ½ to full throttle). The fitting 18 communicates with vacuum chamber 28. Under high vacuum conditions (throttle closed), the piston 24 is forced down by atmospheric pressure overcoming the tension of the vacuum spring 22A. This action moves valve connecting plunger portion 22 across the three equally spaced openings 20 of the air intake portion of the valve body 12A thus shutting off any air from entering the crankcase ventilation line 12 by means of the ports or openings 20. The plunger 22 is threaded into a hole in the piston 24. The bottom end of the plunger 22 can be adjusted to shut off the air holes 20 under idle vacuum conditions on almost any car. A $\frac{7}{8}"\times\frac{1}{8}"$ neoprent "O" ring 24A (see FIG. 2) is installed in a semi-circular groove in the exterior portion of the piston 24 to insure an airtight fit in cylinder 28A. Upward movement of the piston 24 and the valve plunger portion 22, due to the resilient action of the vacuum spring 22A under open throttle conditions, is restrained by end cover 26 which is held in place by a snap-ring 26A located in a groove cut for this purpose in the valve body 12A.

FIG. 3 shows a preferably pleated paper air filter/silencer element designed for use with the MANAIR valve of FIGS. 1 and 2. End pieces 30 are preferably molded of any plastic elastomer which will withstand under-hood temperatures and also has desired resistance to aging. The center hole 30A should preferably be slightly undersized to permit an air-tight slip-fit over the valve body 12A (see FIGS. 1 and 2). Alignment notch 32 fits over the fitting 18 and capillary hose 16 (see FIG. 1). Pleated filter paper element 34 is preferably cemented to the two end pieces 30. Use of the small paper filter element 34 with the MANAIR valve body 12A will not generally require a metallic screen or perforated metal stiffener between the two end plates or pieces 30. However, if polyurethane foam is used as the filter media instead of the pleated filter paper, then metallic stiffeners may be required.

MANAIR VALVE OPERATION

Figure 1:
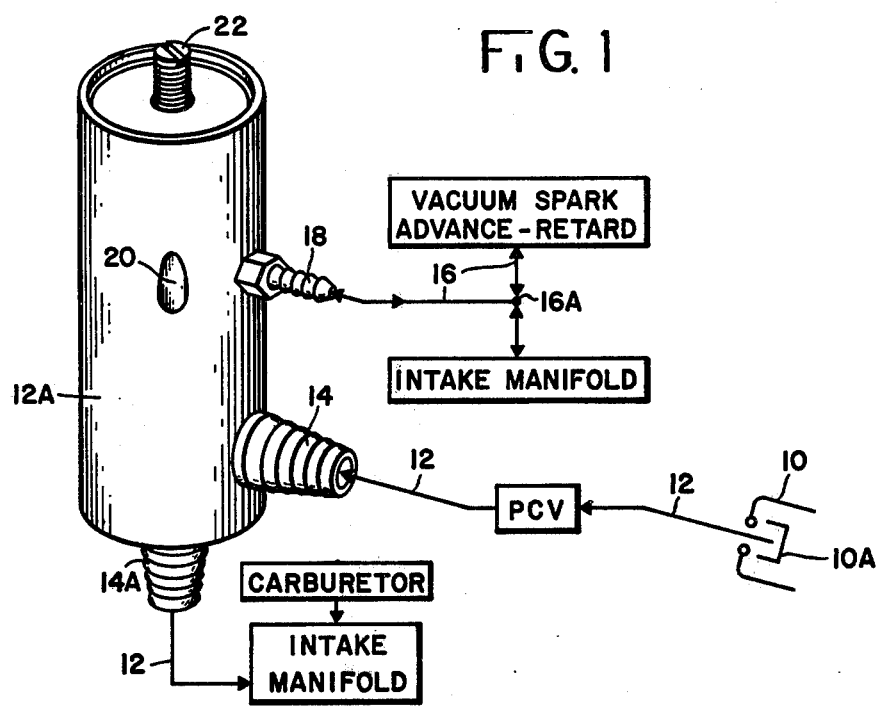
FIG. 1 is an exterior perspective view of the manifold (MANAIR) air valve of this invention with diagrammatic lines and boxes showing incorporation of the valve invention into an internal combustion engine system.

The inherent resistance of the capillary vacuum line 16 will cause the movement of the valve piston 24 connected to the plunger 22 to lag throttle movement in either direction by about 3 to 5 seconds depending on the overall length and size of the capillary vacuum line or hose 16. This is a desirable feature for two reasons: (1) When the throttle is closed during de-acceleration, the manifold mixture becomes momentarily rich until a new steady state throttle setting is established (continuation of air injection into the MANIFOLD from the MANAIR valve will assist in combusting excess fuel during de-acceleration) (2) When the throttle is opened for acceleration the opposite condition occurs and the manifold mixture leans out until a new steady state air-fuel ratio is established. For this reason carburetors are equipped with accelerating pumps for temporary mixture enrichment. A short delay in movement of the plunger 22 avoids addition of air to the manifold during rapid throttle opening, which could cause engine stumbling or hesitation during vehicle acceleration.

The first minute or two after a cold start is a critical period of engine operation. The cold intake air is further cooled in the carburetor venturi due to the refrigerating effect of evaporating gasoline permitting some condensation of the fuel-air vapor within the intake manifold and on the cylinder walls. The throttle butterfly is held partially open by the fast idle cam of the carburetor thus reducing the manifold vacuum. The position of the automatic choke butterfly will depend on the external ambient temperature. Under these conditions, the mixture must be rich to maintain engine operation. If a MANAIR valve is installed and if the valve plunger 22 has been previously adjusted to be closed under curb idle vacuum conditions at normal engine temperature, the reduced vacuum created by the operation of the fast idle cam holding the throttle butterfly valve open during cold starts may not completely cut-off air inlets 20 of the MANAIR valve body 12A. If engine fast idle is not impaired, this is a desirable condition because the air added to the manifold from the MANAIR valve body 12A through air inlets 20 will dilute the rich mixture and assist in re-evaporation of condensed fuel.

The three air entry holes 20 in the valve body 12A are drilled 25 degrees from the vertical. Thus the exit holes in the valve body 12A covered by the valve plunger 22 are oval in shape which facilitates critical adjustment of the point at which airflow starts based on the position of the valve plunger 22.

Figure 2:
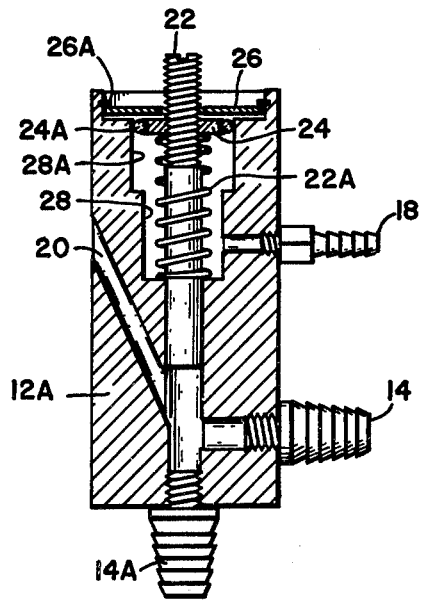
FIG. 2 is a cross-sectional cut away view of the manifold (MANAIR) air valve of FIG. 1 showing internal details of the MANAIR air valve invention.
Figure 3:
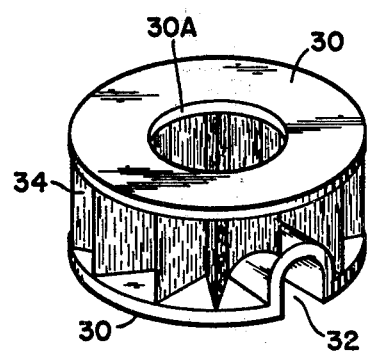
FIG. 3 is a perspective view showing a slip-on air filter/silencer used with the MANAIR air valve invention of FIG. 1.

The stiffness of the vacuum spring 22A in FIG. 2 controls the value of the manifold vacuum at which the air inlets 20 in FIG. 2 are fully open. To obtain maximum utilization of the MANAIR injection device, the MANAIR air valve should be wide open at the cruising speed at which the vehicle is generally operated. Thus, in this condition, the plunger 22 should be in its uppermost position and will only be in its lowest position when the throttle butterfly valve is closed.

While the invention has been particularly described and shown in reference to the preferred embodiments thereof it will be understood by those skilled in the art that various changes in form and detail and omissions may be made therein without departing from the spirit and scope of the invention.

What is claimed:

1. An air valve especially adapted for use with internal combustion engines having a carburetor, a crankcase ventilation system, and an intake manifold comprising, in combination, a valve body, movable plunger valve means located within said valve body for closing off air to the intake manifold during engine idling conditions and for controlling air into the intake manifold for engine operations above idle, first vacuum line means connected to the interior of said valve body from said intake manifold, conduit means connected to the interior of said valve body for communication between said first vacuum line means and the crankcase ventilation system, an air inlet means connected to the interior of said valve body for supplying air into said intake manifold through said first vacuum line means, and second vacuum line means connected to the interior of said valve body for operating said movable plunger valve means to close off air supplied by said air inlet means to the intake manifold during engine idling conditions and for controlling air into the intake manifold for engine operations above idle.

2. An air valve in accordance with claim 1 including resilient means located within said valve body for maintaining said movable plunger valve means in a position to permit air flow from said air inlet means into said intake manifold.

3. An air valve in accordance with claim 2 wherein said resilient means comprising a coiled spring located around a portion of said movable plunger valve means.

4. An air valve in accordance with claim 1 wherein said movable plunger valve means comprising an elongated plunger member and a piston member connected to a portion of said plunger member.

5. An air valve in accordance with claim 4 wherein said piston member having an internal threaded portion, said portion of said plunger member being externally threaded and adjustably connected to said internal threaded piston member.

6. An air valve in accordance with claim 5 including an "O" ring connected to the periphery of said piston member.

7. An air valve in accordance with claim 4 wherein said elongated plunger member having means external to said valve body for adjusting the position of said plunger member in said valve body.

8. An air valve in accordance with claim 7 wherein said adjusting means comprising slotted head means adapted to receive a screw driver for accomplishing a desired adjustment.

9. An air valve in accordance with claim 8 wherein said slotted head means being located on a portion of said plunger member extending through an opening in the top of said valve body.

10. An air valve in accordance with claim 1 including a pollution control valve, said conduit means being coupled to said crankcase ventilation system through said pollution control valve.

11. An air valve in accordance with claim 1 wherein said second vacuum line means being connected to a "T" communicating to the intake manifold or the vacuum spark advance-retard mechanism.

12. An air valve in accordance with claim 1 including air filter means for installation around said valve body and for filtering air passing into said air inlet means.

13. An air valve in accordance with claim 2 wherein said movable plunger valve means comprising an elongated plunger member and a piston member connected to a portion of said plunger member.

14. An air valve in accordance with claim 13 wherein said resilient means comprising a coiled spring located around a portion of said movable plunger valve means.

15. An air valve in accordance with claim 13 wherein said piston member having an internal threaded portion, said portion of said plunger member being externally threaded and adjustably connected to said internal threaded piston member.

16. An air valve in accordance with claim 15 wherein said resilient means comprising a coiled spring located around a portion of said movable plunger valve means.

17. An air valve in accordance with claim 16 including an "O" ring connected to the periphery of said piston member.

18. An air valve in accordance with claim 13 wherein said elongated plunger member having means external to said valve body for adjusting the position of said plunger member in said valve body.

19. An air valve in accordance with claim 18 wherein said adjusting means comprising sloted head means adapted to receive a screw driver for accomplishing a desired adjustment.

20. An air valve in accordance with claim 19 wherein said slotted means being located on a portion of said plunger member extending through an opening in the top of said valve body.

21. An air valve in accordance with claim 13 including a pollution control valve, said conduit means being coupled to said crankcase ventilation system through said pollution control valve.

22. An air valve in accordance with claim 13 wherein said second vacuum line means being connected to a "T" communicating to the intake manifold and a vacuum spark advance-retard mechanism.

23. An air valve in accordance with claim 13 including air filter means for installation around said valve body and for filtering air passing into said air inlet means.

24. An air valve in accordance with claim 21 wherein said second vacuum line means being connected to a "T" communicating to the intake manifold and a vacuum spark advance-retard mechanism.

25. An air valve in accordance with claim 21 including air filter means for installation around said valve body and for filtering air passing into said air inlet means.

26. An air valve in accordance with claim 24 including air filter means for installation around said valve body and for filtering air passing into said air inlet means.

* * * * *